Dec. 25, 1956 R. M. STRASSNER ET AL 2,775,720
DEVIATION PLOTTER
Filed Oct. 1, 1953
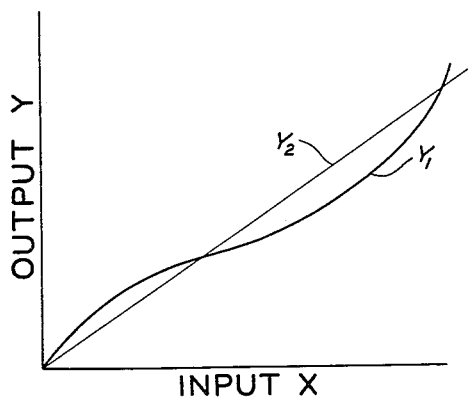
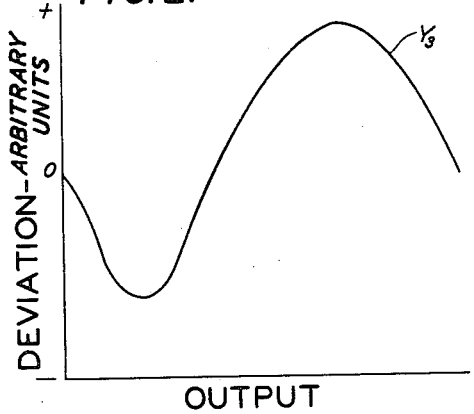
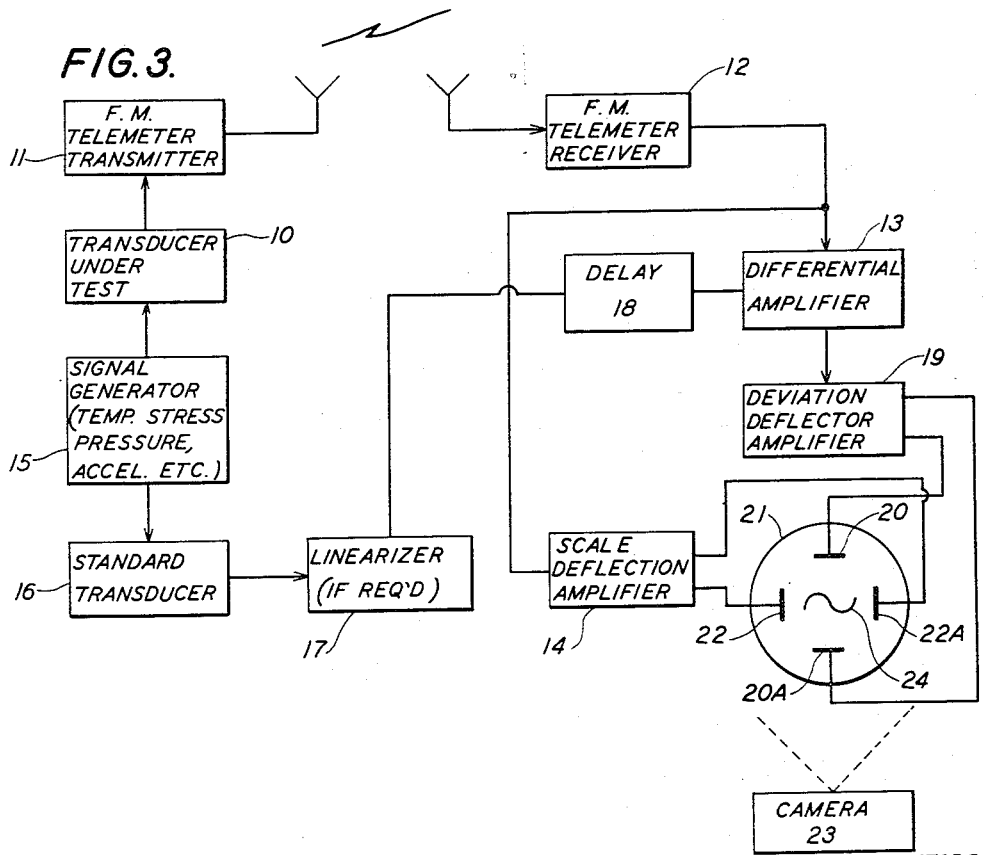
INVENTORS.
ROBERT M. STRASSNER
HARRY E. BURKE
BY James B. Christie
ATTORNEY United States Patent Office 2,775,720
Patented Dec. 25, 1956

2,775,720

DEVIATION PLOTTER

Robert M. Strassner and Harry E. Burke, Pasadena, Calif., assignors, by mesne assignments, to Consolidated Electrodynamics Corporation, Pasadena, Calif., a corporation of California Application October 1, 1953, Serial No. 383,643

5 Claims. (Cl. 315—24)

This invention relates to apparatus for processing data in electrical form, and more specifically, it is concerned with determining automatically the deviation of a first signal from a second signal.

The invention finds application in any system of data handling where the deviation of one signal from another is to be determined. However, the invention is particularly useful in linearizing signals originating from circuits where undesirable non-linear characteristics inherently develop. For example, in the present day FM telemetering systems, the output signals from the ground station discriminators or commutator analyzers are in general non-linear functions of the physical phenomena which they are supposed to represent. In some cases the non-linearities may not be of sufficient magnitude to require correction. In many cases, however, they may be of such magnitude that some form of automatic linearization must be employed to reduce these non-linearities to a level where accurate computations can be made. A co-pending application entitled "Function Generator," Serial No. 362,541, filed June 18, 1953, describes improved apparatus for linearizing non-linear functions.

Before the linearizer described in Serial No. 362,541 can be put into operation, a deviation curve must first be obtained to illustrate the relationship between the non-linear signal and the deviation of the non-linear signal from linearity. In the past, deviation curves have been obtained by applying calibrating input signals to the system to be calibrated and plotting the output of the system as a function of the input signals. In those cases where the output of the system deviated from linearity, a linear curve was drawn which most closely approximated the non-linear curve. A deviation curve representing the excursions of the non-linear curve from the linear curve was then obtained by the tedious and time-consuming process of manually measuring the difference between the curves at representative values of the non-linear system output and plotting the difference against the corresponding output value of the non-linear system.

The present invention provides a deviation plotter whereby a deviation curve is obtained automatically. This considerably reduces the time required for checking data recording and transmitting systems for linearity, and for correcting the systems which prove to be non-linear.

The invention contemplates apparatus for automatically determining the deviation of a first signal from a second signal by applying the first signal to a first pair of deflection plates in a cathode ray tube, and simultaneously applying the corresponding instantaneous deviation of the first function from the second signal to a second pair of deflection plates in the cathode ray tube so that a trace descriptive of the deviation is produced on the cathode ray tube.

In a preferred form of the invention, a deviation curve for the entire range of the first signal is recorded by suitable means, e. g., a camera adapted to photograph the trace produced on the cathode ray tube.

These and other aspects of the invention will be more completely understood in the light of the following detailed description and the accompanying drawings in which:

Fig. 1 shows graphically a non-linear signal of the type under consideration as related to a desired linearity;

Fig. 2 is a graphical portrayal of the deviation of the non-linear signal from a desired linearity; and Fig. 3 is a schematic circuit diagram of one form of deviation plotter in accordance with the invention.

For the purpose of illustration, it is assumed that the non-linear signal results from a system under test comprising a transducer remotely located from a recording station, an FM telemeter transmitter, and an FM telemeter receiver. However, the invention is not specifically embodied in, nor limited to this particular system.

The objective of the deviation plotter can best be understood with reference to Figs. 1 and 2. In Fig. 1, the non-linear output Y of a telemetering system as a function of the percent of full scale input X to the particular transducer involved is plotted as curve $Y_1$. The linear curve $Y_2$ represents the desired response of the system which is under test.

In Fig. 2, the excursions of the non-linear curve $Y_1$ of Fig. 1 from the linear curve $Y_2$ of Fig. 1 are plotted against the corresponding values of the output of the system under test. The result is a deviation curve $Y_3$. The vertical scale of Fig. 2 is expanded to amplify the deviation. Prior to the present invention, the deviation curve $Y_3$ was obtained by selecting the representative values of $Y_1$ and subtracting them from the corresponding values of $Y_2$. The differences were then plotted against the corresponding values of $Y_1$. This operation was performed manually and was time-consuming. In accordance with the present invention, this operation is performed automatically.

One embodiment of the invention is shown diagrammatically in Fig. 3. A transducer 10 which generates a signal when under test is connected to an FM telemeter transmitter 11. An FM telemeter receiver 12 is arranged to receive the signal from the transmitter and feed the signals into a conventional differential amplifier 13 and a scale deflection amplifier 14. The transducer, transmitter, and the receiver constitute that portion of the system which generates the non-linear signal.

A calibrating signal generator 15 is adapted to supply an actuating force, e. g., temperature, pressure, acceleration, etc., to both the transducer under test and to a standard transducer 16. The standard transducer of the same type as the test transducer, and the output of the standard transducer, or its corrected output, represents the desired output from the test transducer. The calibrating signal generator is any suitable means for producing a convenient range of temperature, stress, pressure, acceleration, etc. For example, a variable pressure regulator can be used to apply a variable pressure equally to both of the transducers. The important feature of the calibrating signal generator is that it always supplies equal actuating forces to the two transducers.

The output of the standard transducer is fed into a linearizer 17 of the type described in the co-pending application referred to above. If the output of the standard transducer is linear, the linearizer need not be used. The output from the linearizer (or the standard transducer if the linearizer is not used) constitutes the linear signal, and is fed into the differential amplifier.

Appropriate delaying means 18 are provided in the circuit to synchronize the arrival of the linear signal at the differential amplifier with the arrival of the non-linear signal. The differential amplifier algebraically subtracts the non-linear signal from the linear signal. The output of the differential amplifier represents this difference and is fed into a deviation deflection amplifier 19. The output from the deviation deflection amplifier is applied to the vertical plates 20, 20A of a cathode ray tube 21. The output of the scale deflection amplifier is applied to the horizontal plates 22, 22A of the cathode ray tube. A suitable camera 23 is arranged to photograph the trace 24 produced by the cathode ray tube as required.

The operation of the apparatus is as follows: A calibrating signal from the calibrated signal generator is applied to both the transducer under test and the standard transducer. The transducer under test responds to the actuating force and generates a signal which is relayed to the FM telemeter transmitter. The signal is then transmitted to the telemeter receiver and then to the differential amplifier and the scale deflection amplifier.

The signal produced by the application of the actuating force to the standard transducer is fed through a linearizer (if required) and then to the differential amplifier. Any deviation of the test transducer signal from linearity is detected in the differential amplifier and amplified by the deviation deflection amplifier. The output from the deviation deflection amplifier is applied to the vertical plates of the cathode ray tube. Simultaneously, the output of the scale deflection amplifier is applied to the horizontal plates of the cathode ray tube.

Thus, as the test transducer is exercised over its full range, its resulting signal controls the horizontal position of the electron beam of the cathode ray tube. Similarly, the deviation of the test transducer signal from linearity controls the vertical position of the electron beam in the cathode ray tube.

With the above described apparatus, a deviation curve can be obtained within a few seconds by simply causing the calibrating signal generator to supply actuating forces covering the operating range of the test transducer. This causes the electron beam to trace a deviation curve on the cathode ray tube which can be permanently recorded with a suitable camera. The system also possesses the advantage that transducers can be quickly evaluated by visual inspection to determine their deviation from linearity.

The photograph of the deviation curve is well suited for constructing the birefringement element described in conjunction with the function generator disclosed in the above-mentioned co-pending application. A photographic print of suitable size is made of the deviation curve and the print is cut into along the curve. Either one of the pieces of the print is then used as a pattern for cutting the birefringement material to the appropriate shape.

We claim:

1. Apparatus for automatically determining the deviation of a first function from a second function comprising the combination of a cathode ray tube, a signal generator, means responsive to the signal generator for creating the first function, means responsive to the signal generator for creating the second function, means for obtaining the instantaneous deviation of the first function from the second function, means for applying the first function to a first deflection element in the cathode ray tube, and means for applying the corresponding instantaneous deviation to a second deflection element in the cathode ray tube whereby a trace of the deviation of the first function from the reference function is produced in the screen of the tube.

2. Apparatus for automatically obtaining a plot of a non-linear signal versus the deviation of the non-linear signal from a linear signal comprising a cathode ray tube having two pairs of deflection plates, means for automatically determining the instantaneous difference between the two signals, means for applying the difference to one pair of deflection plates and means for simultaneously applying the corresponding instantaneous value of the non-linear signal to the other pair of deflection plates so that a trace is produced on the cathode ray tube.

3. Apparatus for automatically obtaining a plot of a non-linear signal versus the deviation of the non-linear signal from a linear signal comprising means for producing the two signals simultaneously, a differential amplifier for determining the algebraic difference between the two signals at any arbitrary values of the signals, a cathode ray tube having two pairs of deflection plates, means for applying the non-linear signal to one pair of deflection plates, and means for simultaneously applying the corresponding difference between the non-linear signal and the linear signal to the other pair of deflection plates so that a trace is produced on the cathode ray tube.

4. In apparatus having a cathode ray tube and a camera for recording traces produced by the cathode ray tube, the improvement comprising a signal generator, means responsive to the signal generator for creating a first function, means responsive to the signal generator for creating a second function, means for obtaining the instantaneous deviation of the first function from the second function, means for applying the first function to a first deflection element in the cathode ray tube, and means for applying the corresponding instantaneous deviation to a second deflection element in the cathode ray tube so that a trace is produced on the cathode ray tube representing the deviation.

5. In apparatus having a cathode ray tube having two pairs of deflection plates and a camera for recording traces produced by the cathode ray tube, the improvement comprising means for producing a linear signal and a non-linear signal simultaneously, a differential amplifier for determining the algebraic difference between the two signals at any arbitrary value of the non-linear signal, means for applying the non-linear signal to one pair of deflection plates, and means for simultaneously applying the corresponding difference between the non-linear signal and the linear signal to the other pair of deflection plates so that a trace is produced on the cathode ray tube.

References Cited in the file of this patent

UNITED STATES PATENTS

| | | |
|---|---|---|
| 2,081,739 | Dissler | May 25, 1937 |
| 2,483,147 | Mol | Sept. 27, 1949 |
| 2,561,612 | Culver | July 24, 1951 |
| 2,612,626 | Miles | Sept. 30, 1952 |
| 2,629,829 | Daly | Feb. 24, 1953 |

OTHER REFERENCES

"Vacuum Tube Amplifiers," Valley and Wallman, pub. Oct. 1, 1948, pp. 441–450.